United States Patent
Davidov et al.

(10) Patent No.: US 11,706,150 B2
(45) Date of Patent: Jul. 18, 2023

(54) DATA ENCODING AND PACKET SHARING IN A PARALLEL COMMUNICATION INTERFACE

(71) Applicant: Apple Inc., Cupertino, CA (US)

(72) Inventors: Dany Davidov, Tirat Carmel (IL); Nir Leshem, Beit Yanai (IL); Mark Pilip, Kiryat Bialik (IL); Sergio Kolor, Haifa (IL)

(73) Assignee: Apple Inc., Cupertino, CA (US)

( * ) Notice: Subject to any disclaimer, the term of this patent is extended or adjusted under 35 U.S.C. 154(b) by 177 days.

(21) Appl. No.: 17/223,770

(22) Filed: Apr. 6, 2021

(65) Prior Publication Data

US 2022/0321490 A1 Oct. 6, 2022

(51) Int. Cl.
*H04L 47/35* (2022.01)
*H04L 69/22* (2022.01)
*H04L 47/32* (2022.01)

(52) U.S. Cl.
CPC .............. *H04L 47/35* (2013.01); *H04L 47/32* (2013.01); *H04L 69/22* (2013.01)

(58) Field of Classification Search
CPC ..... H04L 47/10; H04L 47/24; H04L 47/2483; H04L 47/32; H04L 47/35; H04L 47/43; H04L 69/22
See application file for complete search history.

(56) References Cited

U.S. PATENT DOCUMENTS

| | | | |
|---|---|---|---|
| 6,633,564 B1 * | 10/2003 | Steer | H04L 47/10 370/389 |
| 7,043,541 B1 * | 5/2006 | Bechtolsheim | H04L 41/0806 709/236 |
| 7,782,805 B1 * | 8/2010 | Belhadj | H04L 47/00 370/476 |
| 8,340,005 B1 | 12/2012 | Belhadj et al. | |
| 9,432,288 B2 | 8/2016 | Barner et al. | |
| 10,417,171 B1 | 9/2019 | Sarmah | |
| 10,423,567 B2 | 9/2019 | Khan et al. | |
| 2003/0110233 A1 * | 6/2003 | Prall | H04L 47/36 709/213 |
| 2005/0163168 A1 * | 7/2005 | Sheth | H04L 47/30 370/537 |

(Continued)

FOREIGN PATENT DOCUMENTS

CA 3062272 A1 * 10/2018 ............. H04L 45/24

*Primary Examiner* — Kevin D Mew
(74) *Attorney, Agent, or Firm* — Kowert, Hood, Munyon, Rankin & Goetzel, P.C.; Scott W. Pape; Dean M. Munyon

(57) ABSTRACT

An apparatus includes an interface circuit and an encoder circuit. The interface circuit is configured to send a data packet via a plurality of segments, and to send an idle value via the plurality of segments when no data packet is available. The idle value is configured to cause a segment in a receiving apparatus to idle. The encoder circuit is configured to receive a particular data packet, and, if a portion of the particular data packet has a same value as the idle value for a subset of the plurality of segments, to replace at least a portion of the data packet with a mask value to generate a modified data packet. The mask value indicates how to recreate the particular data packet. The encoder circuit is further configured to send the modified data packet to the receiving apparatus via the plurality of segments of the interface circuit.

20 Claims, 8 Drawing Sheets

(56) References Cited

U.S. PATENT DOCUMENTS

| | | | |
|---|---|---|---|
| 2006/0256875 A1* | 11/2006 | McClellan | H04J 3/0602 375/242 |
| 2007/0195815 A1* | 8/2007 | Turner | H04L 67/56 370/252 |
| 2010/0153828 A1* | 6/2010 | De Lind Van Wijngaarden | H03M 13/09 714/799 |

* cited by examiner example 300a

Idle Packet 320a (from interface circuit 210)

| Idle Value 321h '0000-00000' | Idle Value 321g '0000-00000' | Idle Value 321f '0000-00000' | Idle Value 321e '0000-00000' | Idle Value 321d '0000-00000' | Idle Value 321c '0000-00000' | Idle Value 321b '0000-00000' | Idle Value 321a '0000-00000' |

Decoder Circuit 201
*status = idle* example 300b

Data Packet 320b (from interface circuit 210)

| Portion 322h '1110-00011" | Portion 322g '1100-01011" | Portion 322f '0100-00001' | Portion 322e '0000-00001' | Portion 322d '0001-01010' | Portion 322c '1000-01000' | Portion 322b '1111-11111' | Portion 322a '0001-10010' |

Decoder Circuit 201
*status = receive data without decoding*

| Portion 322h '1110-00011" | Portion 322g '1100-01011" | Portion 322f '0100-00001' | Portion 322e '0000-00001' | Portion 322d '0001-01010' | Portion 322c '1000-01000' | Portion 322b '1111-11111' | Portion 322a '0001-10010' |

Decoded Data Packet 330b example 300c

Data Packet 320c (from interface circuit 210)

| Portion 323h '1110-00011" | Portion 323g '1100-01011" | Portion 323f '1111-11111' | Portion 323e '1111-11111' | Portion 323d '0001-11010' | Portion 323b '1000-01000' | Portion 323a '1111-11111' | Mask Value 325 "1001-10100" |

Decoder Circuit 201
*status = receive data and decode*

| Portion 323h '1110-00011" | Portion 323g '1100-01011" | Portion 323f '0000-00000' | Portion 323e '0000-00000' | Portion 323d '0001-11010' | Portion 323c '0000-00000' | Portion 323b '1000-01000' | Portion 323a '1111-11111' |

Decoded Data Packet 330c

*most significant portion 342*          *least significant portion 344*

Receiving, by an encoder circuit, a particular data packet having a plurality of bits arranged in an original order for sending via an interface circuit that includes a plurality of segments.
510

Determining, by the encoder circuit, that a group of the plurality of bits corresponds to an idle value for a subset of the plurality of segments.
520

Self-encoding, by the encoder circuit, the particular data packet by replacing at least a portion of the group of bits with a mask value that indicates, to a receiving decoder circuit, how to decode the self-encoded data packet.
530

Sending, by the interface circuit using the plurality of segments, the self-encoded data packet to the decoder circuit.
540

FIG. 5

DATA ENCODING AND PACKET SHARING IN A PARALLEL COMMUNICATION INTERFACE

BACKGROUND

Technical Field

Embodiments described herein are related to systems-on-a-chip (SOCs) and, more particularly, to parallel communication interfaces.

Description of the Related Art

System-on-a-chip (SOC) integrated circuits (ICs) generally include one or more processors that serve as central processing units (CPUs) for a system, along with various other components such a memory controllers and peripheral components. Additional components, including one or more additional ICs, can be included with a particular SOC IC to form a given device. For example, an SOC may include any suitable combination of one or more general-purpose processors, a graphics processors, an audio processor, security and/or cryptography circuits, networking circuits (e.g., one or more circuits supporting ethernet, universal serial bus (USB), peripheral component interconnect express (PCIe)), memory controllers, display controllers, and the like.

To communicate among the processors, memory controllers, peripherals, and other components (collectively referred to as "agents"), the SOC may include a bus circuit capable of transferring data packets with a particular number of bits in parallel. Such a bus circuit may include a variety of interfaces, buffers, and/or other circuits to perform data packet transfers between two or more agents. By transferring data packets with 32, 64, 128, or more bits in parallel, data may be transferred between agents in a sufficient amount of time for a given application. To increase bandwidth for transferring data, some SOCs may include a plurality of bus circuits. For example, one bus circuit may be used for a plurality of general-purpose processors to exchange data with each other and one or more memory controllers. Another bus circuit may be used for transferring graphics information between a graphics processor, a display interface, and a camera circuit. In addition, a third bus circuit may be included for exchanging data between agents that have low priority information to exchange, such as a file being saved from a volatile memory to a non-volatile memory. A number and size of bus circuits on a given SOC may be based, at least partially, on die area and/or power supply considerations.

SUMMARY

In an embodiment, an apparatus includes an interface circuit, including a plurality of segments, and an encoder circuit. The interface circuit may be configured to send individual bits of a data packet in parallel via the plurality of segments, and to send an idle value via the plurality of segments when no data packet is available to send. The idle value may correspond to a particular bit sequence per segment, and may be configured to cause a corresponding segment in a receiving apparatus to be idle. The encoder circuit may be configured to receive a particular data packet having a plurality of bits arranged in an original order. In response to a determination that a group of the plurality of bits have a same value as the idle value for a subset of the plurality of segments, the encoder circuit may be configured to replace at least a portion of the group of bits with a mask value to generate a modified data packet. The mask value may indicate, to a receiving apparatus independent of control signals external to the particular data packet, how to recreate the particular data packet with the bits arranged in the original order. The encoder circuit may be configured to send the modified data packet to the receiving apparatus via the plurality of segments of the interface circuit.

In a further embodiment, to replace the at least a portion of the group of bits with the mask value, the encoder circuit may be configured to include the mask value within a particular segment of the plurality of segments. In an embodiment, the encoder circuit may by further configured to modify values of one or more of the group of bits for the subset of segments.

In one embodiment, to include the mask value in the particular segment, the encoder circuit may be further configured to shift one or more bits of the plurality of bits from the particular segment into a different segment and insert the mask value into a particular set of bit positions vacated by the shifted bits. In an example, to include the mask value in the particular segment, the encoder circuit may be further configured to set a particular bit of the particular segment to a value that indicates that the mask value is included in the particular segment.

In a further example, to send the idle value, the interface circuit may be configured to send the idle value in a particular set of segments of the plurality of segments. In an example, the apparatus may further include a plurality of networks, and a first and a second group of the plurality of segments may be coupled, respectively, to a first and a second network of the plurality of networks.

BRIEF DESCRIPTION OF THE DRAWINGS

The following detailed description makes reference to the accompanying drawings, which are now briefly described.

FIG. 3 depicts a three examples of a decoding circuit receiving a different data packet in each example.

FIG. 5 illustrates a flow diagram of an embodiment of a method for encoding a data packet with a mask value.

Figure 1:
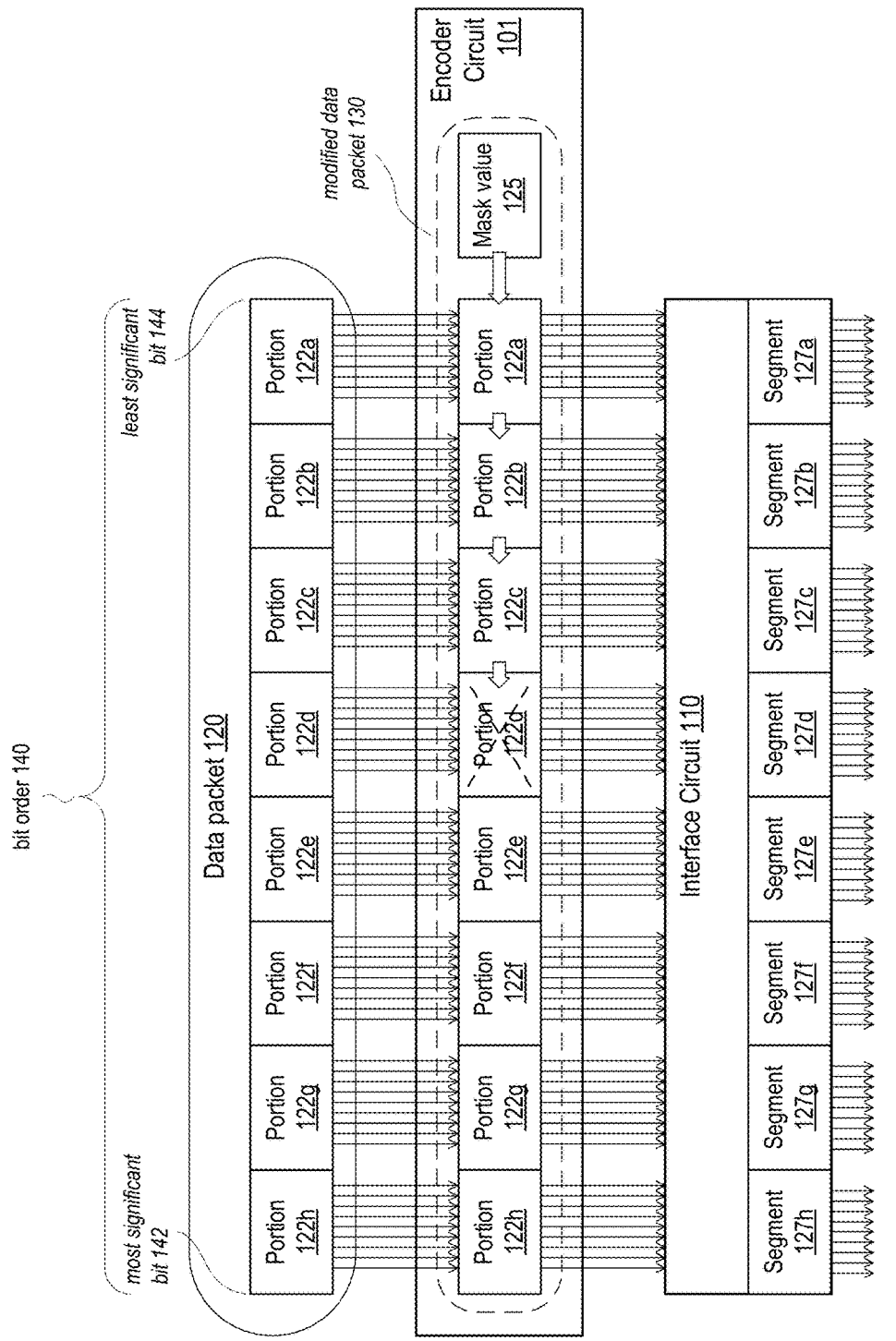
FIG. 1 illustrates a block diagram of an embodiment of a system with an encoder circuit that receives a data packet to be sent via a communication interface.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

As described above, a given integrated circuit (IC) design may include one or more bus circuits to enable communication between a plurality of agents. As used herein, an "agent" refers to a functional circuit that is capable of initiating or being a destination for a transaction on a bus circuit. Accordingly, general-purpose processors, graphics processors, network interfaces, memory controllers, and other similar circuits may be referred to as agents. In some cases, a data exchange between two agents across one of the bus circuits (also referred to as a "transaction"), may have a particular priority. For example, in a user computer device (e.g., desktop/laptop computer, smartphone, tablet, and the like), launching an application initiated by a user may be treated with a high priority, as any delays could be noticed by the user and generate a sense of low performance in the user's opinion if the delays are longer than expected. In contrast, a background process that is synchronizing user data with an online account may occur without the user's knowledge, and therefore, be treated with a lower priority than the launch of the user's application.

To manage the variety of data transactions between the various agents, a plurality of bus circuits may be implemented, with particular bus circuits prioritized for particular types of transactions. Bus circuits, however, consume both die area and power on an IC. As such, SOC designers may balance performance of the SOC agents with limitations on die area and/or power budgets. Accordingly, SOC designers may desire a bus circuit design that increases an amount of data that can be transferred in relation to the die area and/or power that the bus circuit consumes. One technique for reducing a die area of a bus circuit, as well as for reducing power consumption, is to reduce a number of control signals associated with the bus circuit for a given number of bits that can be transferred in parallel. A reduced number of physical wires may result in less die area used for a given number of bits that can be transferred in parallel. Fewer control signals may also reduce power consumption by reducing a number of signals switching for a given transaction.

Reducing a number of control signals, however, may pose several challenges. For example, another technique for reducing power consumption of a bus circuit includes sending an indication to one or more agents on a bus circuit to enter an idle state. The idle state may indicate that no transaction is currently in progress, allowing bus interface circuits receiving the idle indication to place associated circuits of the interface into a reduced power state. To avoid utilizing an additional wire for a control signal to indicate the idle state, a particular value may be reserved for the data wires of the bus circuit to indicate the idle state, referred to herein as an "idle value." For example, a value of all logic high bits or all logic low bits may be used as the idle value. A bus interface circuit detecting the idle value may ignore the bus circuit until a different value is detected, e.g., disable a clock signal to circuits that sample values on the bus circuit.

While such a value may reduce power consumption of a bus circuit and/or agents coupled to the bus circuit without increasing a number of control signals, an issue arises when a transaction includes a valid data value that coincidentally equals the idle value. A transaction includes one or more data packets being transferred across a bus circuit from a source agent that initiates the transaction to a destination agent that is to receive the transaction. A "data packet" or simply "packet" as used herein, refers to a group of bits that are sent over the bus in parallel within a given bus cycle. For example, to send a transaction that includes 1000 bytes of data across a bus circuit that supports data packets of 128 bits (sixteen bytes) requires at least 63 data packets. If one of these data packets happens to correspond to the idle value, then an indication needs to be provided to the destination agent to avoid having the destination agent incorrectly interpret the valid data packet as an idle value.

Further complicating the issue, bus interface circuits, in some embodiments, may be implemented using a plurality of segment circuits (or simply "segments"), in which each segment includes components for transferring a number of bits. A set of segments may be used together to transfer a single data packet in parallel. For example, a 128-bit bus interface circuit may be implemented using four 32-bit segments. Although operating in parallel, each segment may operate independently from the other segments. In such embodiments, an idle value may be implemented per segment, rather than across an entire data packet, thereby increasing a possibility of a given data packet including a coincidental idle value for at least one segment.

To address such an issue, techniques are contemplated that include encoding a data packet before sending the data packet across a bus circuit. Such an encoding technique may include sending a data packet to an encoder circuit prior to transmission across the bus circuit. The encoder circuit may determine if the received data packets includes a value that could be misinterpreted as an idle value by one or more segments of the bus circuit. If such a case is detected, then a mask value is generated and used to replace at least a portion of the data packet. This mask value may be used by a destination agent to decode the encoded data packet to reconstruct the original data packet. For example, a mask value may be generated in which a particular bit of the mask value indicates whether a corresponding segment of an encoded data packet holds a valid value that can be misinterpreted as an idle value.

By encoding the mask value into the data packet, the idle value may still be utilized without an addition of a number of control signals to each segment of an interface. Avoiding an increase in a number of control signals may save power and/or die area of an IC in comparison to an IC in which additional control signals are added.

FIG. 1 illustrates a block diagram of one embodiment of a system that encodes a data packet before sending the data packet via an interface circuit. As illustrated, system 100 includes encoder circuit 101 and interface circuit 110. Interface circuit 110 further includes a plurality of segments 127a-127h (collectively segments 127). In some embodiments, system 100 is implemented as an integrated circuit (IC). Encoder circuit 101 and interface circuit 110 may be coupled to one or more agents on the IC via a bus circuit. Interface circuit 110 may, in some embodiments, be further coupled to a different IC via a plurality of pins.

As shown, interface circuit 110, including segments 127, is configured to send individual bits of a data packet in parallel via segments 127. For example, a source agent may initiate a transaction, including one or more data packets, to be sent to a destination agent. To send a given data packet of the transaction, the source agent sends the data packet to interface circuit 110, which in turn, sends the data packet to the destination agent. In various embodiments, the data packet may be sent to additional circuits, including, for example, bus switches and/or other interface circuits on the way to the destination agent. In some embodiments, interface circuit 110 may be coupled to a different interface circuit on a different IC.

Interface circuit 110, as illustrated, is further configured to send an idle value via segments 127 when no data packet is available to send. The idle value corresponds to a particular bit sequence per segment, and is configured to cause a corresponding segment in a receiving apparatus to be idle, also referred to as an idle state. The idle value may be utilized to reduce power consumption in the receiving apparatus when no data packets are being transferred. The idle value may indicate to the receiving apparatus that no data is currently being sent, thereby preventing the receiving apparatus from wasting resources by processing invalid data. In some embodiments, the receiving apparatus may remain active, but ignore any received data packets corresponding to the idle value. In other embodiments, the receiving apparatus may take actions to reduce power consumption during an idle state. For example, the idle state may prevent one or more signals (e.g., a clock signal and/or other control signals) of a corresponding segment that is associated with the destination agent from transitioning. Reducing a number of signal transitions may reduce a dynamic power consumed by the corresponding segments.

In some cases, however, a data packet may include a value, that when aligned to segments 127, results in one or more of segments 127 asserting an idle value. In such cases, the value sent by the one or more segments 127 is intended to be interpreted as a valid data value, and not as an idle value. In some embodiments, an additional control signal may be added to indicate to a receiving segment when an idle value is being sent versus other valid information. With a segmented interface, such as interface circuit 110, a control signal may be required for each segment 127, which may increase a die size and or power consumption of system 100. In a system with few segments, the additional control signals may be acceptable. In other systems, tens, hundreds, or even more segments may be included in a given interface circuit. The additional die area and/or power consumption from the needed control signals may not be acceptable.

To address the idle value issue without adding an undesirable number of control signals, system 100 includes encoder circuit 101. As illustrated, encoder circuit 101 is configured to receive data packet 120 having a plurality of bits arranged in bit order 140, from least significant bit 144 to most significant bit 142. Data packet 120 includes a plurality of portions 122a-122h (collectively portions 122), wherein each portion aligns to a respective one of segments 127.

In response to a determination that a group of the plurality of bits have a same value as the idle value for a subset of segments 127, encoder circuit 101 is further configured to replace at least one of portions 122 of the group of bits with mask value 125 to generate modified data packet 130. In the example of FIG. 1, portion 122d corresponds to the idle value. In other examples, more than one portion 122 may correspond to the idle value.

Mask value 125 indicates, to a receiving apparatus independent of control signals external to data packet 120, how to recreate data packet 120 with the bits arranged in bit order 140. For example, encoder circuit 101 may generate mask value 125 with at least one bit corresponding to a respective one of portions 122. The at least one bit is given a first value if the respective portion includes the idle value, and a different value if the idle value is not included. Additionally, encoder circuit 101 is further configured to set a particular bit of mask value 125 to a value that indicates that mask value 125 is included in the modified data packet 130. For example, eight portions are depicted in FIG. 1 for data packet 120. Each of portions 122 may include nine bits. Mask value 125 may, therefore use eight bits of mask value 125 to indicate which of segments 127 include portions 122 of modified data packet 130 that correspond to the idle value, and use the ninth bit to indicate that the value placed in segment 127a is a mask value and not part of the original data packet 120.

To replace the at least a portion of the group of bits with mask value 125, encoder circuit 101 is further configured to include mask value 125 within a particular segment of segments 127. As shown, encoder circuit 101 replaces the least significant portion, portion 122a, with mask value 125 to generate modified data packet 130. Mask value 125 will be sent via segment 127a. In addition, to include mask value 125 in segment 127a, encoder circuit 101 is further configured to shift one or more bits of the plurality of bits from segment 127a into a different segment and insert mask value 125 into a particular set of bit positions vacated by the shifted bits. For example, portions 122a-122c include valid data that does not correspond to the idle value. Accordingly, portions 122a-122c are shifted in modified data packet 130 to an adjacent portion in a next higher order of significance. Since portion 122d includes the idle value, portion 122d is removed from modified data packet 130. Portions 122a-122c, therefore, are sent via segments 127b-127d, respectively.

After modified data packet 130 is generated, encoder circuit 101 is further configured to send modified data packet 130 to the receiving apparatus via segments 127 of interface circuit 110. In some embodiments, segments 127 may be implemented as multiple instances of a single circuit design. As such, each segment may have a respective power and/or clock signal for performing the transfer of modified data packet 130. While data packets are described as being transferred via interface circuit 110 in parallel, the individual operation of each of segments 127 may result in portions 122 not being perfectly aligned. Accordingly, as used herein, "parallel" is used to indicate operations that are performed in a substantially overlapping manner. Beginnings and/or endings of two or more parallel operations may not, however, align exactly.

It is noted that system 100, as illustrated in FIG. 1, is merely an example. The illustration of FIG. 1 has been simplified to highlight features relevant to this disclosure. Various embodiments may include different configurations of the circuit elements. For example, interface circuit 110 is shown with eight segments 127. In other embodiments, any suitable number of segments may be included. Mask value 125 is shown to replace a least significant one of portions 122. In other embodiments, a most significant portion or any other particular one of portions 122 may be replaced by mask value 125.

FIG. 1 illustrates an encoding operation of a data packet before being sent to a receiving apparatus. The receiving apparatus may include a corresponding decoder circuit to reconstruct an original data packet. One example of a decoder circuit is shown in FIG. 2.

Figure 2:
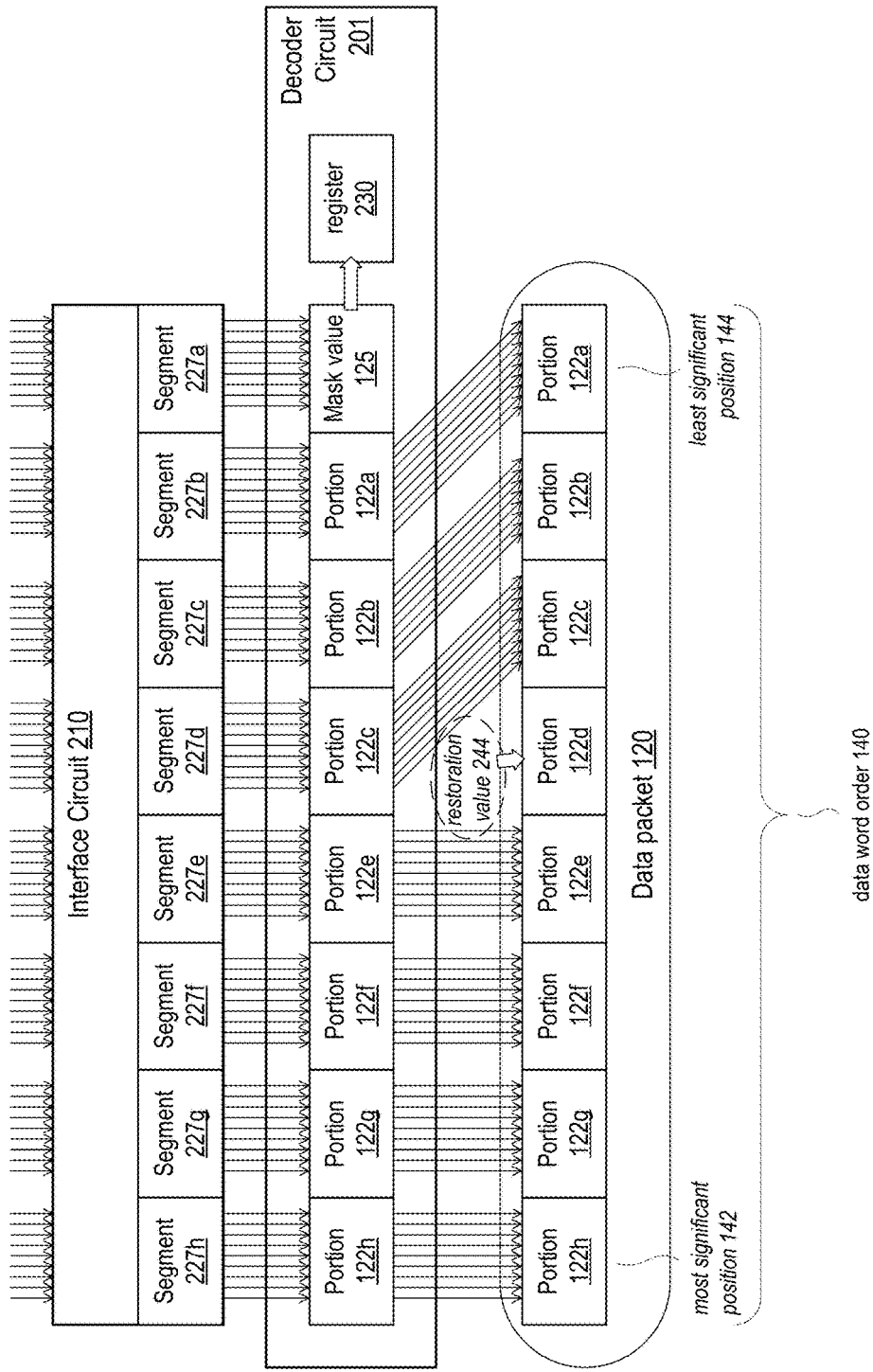
FIG. 2 shows a block diagram of an embodiment of a system with a communication interface that receives a data packet to be sent to a decoding circuit.

Moving to FIG. 2, a block diagram of an embodiment of a system that receives a data packet via an interface circuit and then restores the data packet to an original state is shown. As illustrated, system 200 includes decoder circuit 201 and interface circuit 210. Interface circuit 210 further includes a set of segments 227a-227h (collectively segments 227). In a similar manner as described above for system 100 of FIG. 1, system 200 may, in some embodiments, be implemented as an integrated circuit (IC), and decoder circuit 201 and interface circuit 210 may be coupled to one or more agents on the IC via a bus circuit. Interface circuit 210 may, in some embodiments, be further coupled to a different IC via a plurality of pins. For example, interface circuit 210 may be implemented on a first IC and coupled to interface circuit 110 implemented on a second IC via a plurality of conductive paths.

As illustrated, interface circuit 210 is configured to receive an encoded data packet via segments 227. For example, segments 227 may be aligned with and coupled to segments 127 of FIG. 1. Respective portions of the received data packet may be held in ones of segments 227. Decoder circuit 201 is configured to access segments 227, and extract mask value 125 from the received data packet. For example, decoder circuit 201 may be configured to determine whether a particular one of segments 227, e.g., segment 227*a* as illustrated, includes a mask value or includes a portion of the received data packet. In some embodiments, a portion of segment 227*a* may be used to indicate presence of a mask value, such as a most or least significant bit of segment 227*a*. The extracted mask value 125 is stored in register 230 in decoder circuit 201, as shown.

After extracting mask value 125, decoder circuit 201 is further configured to replace, in the received data packet, mask value 125 with restoration value 244 that corresponds to the idle value. Since mask value 125 is included in segment 227*a* to indicate that at least one portion of the received data packet included an idle value, the idle value is used as restoration value 244 to restore the data packet to its original state. As illustrated, the portion of the received data packet that included mask value 125 is replaced by adding restoration value 244. Restoration value 244, however, may not be placed in a same position as mask value 125. Rather, decoder circuit 201 is further configured to reconstruct, using mask value 125, data packet 120 to include restoration value 244.

In the example of FIG. 2, decoder circuit 201 uses mask value 125 to determine that segments 227*b*-227*d* include, respectively, portions 122*a*-122*c* of data packet 120. Accordingly, decoder circuit 201 shifts portions 122*a*-122*c* received in segments 227*b*-227*d* into the three least significant positions of the reconstructed data packet 120. The remaining segments 227*e*-227*h* include portions 122*e*-122*h*, which are received in their proper positions for reconstructed data packet 120. Portion 122*d*, therefore, is determined (using mask value 125) to be missing from the received data packet in segments 227, and decoder circuit 201 places restoration value 244 in a position corresponding to portion 122*d*.

It is noted that the embodiment of FIG. 2 is one example. In other embodiments, a different combination of elements may be included. For example, a different number of segments may be included instead of eight. Although FIG. 2 depicts 9 pins included in each segment 227, in other embodiments, any suitable number of pins may be included per segment. Mask value 125 is shown to be received in a least significant one of segments 227. In other embodiments, a most significant segment or any other particular one of segments 227 may include mask value 125.

In the description of FIGS. 1 and 2, a single portion of a data packet is depicted as including an idle value. In various cases, a given data packet may include no idle values or multiple idle values. In some cases, an actual idle value may be sent to indicate an idle state. Various examples of packets are shown in FIG. 3.

Turning to FIG. 3, three examples of packets received by a decoder circuit are shown. As illustrated, examples 300*a*-300*c* illustrate behavior of decoder circuit 201 of FIG. 2 after receiving various forms of packets. Example 300*a* depicts decoder circuit 201 receiving idle packet 320*a*. Example 300*b* shows decoder circuit 201 receiving data packet 320*b*, which does not include a mask value. Example 300*c* shows decoder circuit 201 receiving data packet 320*c* which includes mask value 325, as well as several portions that originally included idle values.

As illustrated, example 300*a* includes decoder circuit 201 receiving (from interface circuit 110 via interface circuit 210, for example) idle packet 320*a*. To send idle packet 320*a*, interface circuit 110 is configured to send idle value 321*a*-321*g* in a particular set of segments 127*a*-127*h*. In the example, the idle value is '00000000' and is sent via all eight of segments 127 of FIG. 1. In other embodiments, however, the idle value may be set to any predetermined value and may be sent via a subset of segments 127. For example, the idle value may be '010101010' and may be sent to half of segments 127, such as segments 127*a*, 127*c*, 127*e*, and 127*g*. In such an embodiment, segments 127*b*, 127*d*, 127*f*, and 127*h* may determine whether to enter an idle state based on a respective one of segments 127*a*, 127*c*, 127*e*, and 127*g*.

Idle packet 320*a*, as shown, is sent decoder circuit 201, which may then enter a static or reduced activity state. For example, one or more clock signals may be gated to reduce a number of signal transitions occurring within decoder circuit 201. Interface circuit 210 may also enter a reduced activity state in response to detecting idle packet 320*a*. In some embodiments, interface circuit 210 may not send idle packet 320*a* to decoder circuit 201, and decoder circuit 201 instead enters a reduced activity state in response to the reduced activity of interface circuit 210. In response to receiving a data packet with a non-idle value, then interface circuit 210 and decoder circuit 201 return to full operational states.

In example 300*b*, decoder circuit 201 receives data packet 320*b* from interface circuit 110 via interface circuit 210. Data packet 320*b* includes portions 322*a*-322*h* (collectively portions 322). Since none of portions 322 have values that correspond to the idle value (e.g., '00000000' in the current examples), a mask value is not generated for data packet 320*b* and all portions may be sent by interface circuit 110 to interface circuit 210 without changes to any values. Accordingly, decoder circuit 201 generates decoded data packet 330*b* with the same values as data packet 320*b* as received via interface circuit 210.

In example 300*c*, decoder circuit 201 receives a data packet that includes a mask value. Similar to the other two examples, decoder circuit 201 receives, from interface circuit 110 via interface circuit 210, data packet 320*c* that includes portions 323*a*-323*h* (collectively portions 323). In various embodiments, the mask value may be placed in any suitable portion of the data packet. In the illustrated example, mask value 325 is placed in a least significant portion 344 of data packet 320*c*.

Since mask value 325 is included within data packet 320*c* in a position that, in many cases, includes information other than a mask value, an indication is used to alert decoder circuit 201 that a mask value is included rather than other information. To include mask value 325 in a particular segment (corresponding, in example 300*c*, to the least significant portion 344), encoder circuit 101 of FIG. 1 is further configured to set a particular bit of the particular segment to a value that indicates that mask value 325 is included in the particular segment. In mask value 325, the most significant bit (underlined and in bold) is used as this indication. When this bit is set to '1' as it is for mask value 325, then the value in the least significant portion of a received data packet is a mask value. If it is set to '0' as it is for portion 322a in example 300b, the value in the least significant portion of a received data packet may be treated as data.

Decoder circuit 201 is further configured to identify the inclusion of mask value 325 using a portion of a received value from the particular one of a set of segments of interface circuit 210. As described for the examples of FIG. 3, the particular one of the segments is the least significant one and the portion of the value in this segment is the most significant bit. The inclusion of mask value 325 is indicated by the value of '1' in the most significant bit of the value received via segment 227a of interface circuit 210.

To encode data packet 320c, encoder circuit 101 is further configured to modify values for a subset of segments 127 that would otherwise send values that correspond to the idle value. In response to a determination that more than one of a plurality of values have a same value as the idle value, encoder circuit 101 is configured to replace the values that are the same as the idle value with a particular value that is different than the idle value. As shown in FIG. 3, the idle value is '000000000' and the particular value is '111111111.' In other embodiments, the idle value and/or the particular value may be any other suitable values.

To reconstruct the original data packet, decoder circuit 201 is further configured to identify, using mask value 325, ones of segments 227 that include the particular value; and replace the particular value with the idle value. Decoder circuit 201 generates decoded data packet 330c by identifying, based on mask value 325, which portions of the decoded data packet 330b should be set to the idle value. The most significant bit of mask value 325 is the indication that the portion should be treated as a mask value. The remaining eight bits are used to indicate which portions of decoded data packet 330b should be set to the idle value, with the most significant bit of the eight bits corresponding to the most significant portion, and so forth to the least significant bit corresponding to the least significant portion. A bit value of '0' indicates the value of the corresponding portion is included in data packet 320c, while a bit value of '1' indicates the corresponding portion should be set to the idle value. The third, fifth, and sixth bits of mask value 325 (counting from the least significant bit) are set to one, indicating that portions 323c, 323e and 323f are to be changed from the particular value ('111111111') in data packet 320c to the idle value ('000000000') in decoded data packet 330c.

It is noted that, in example 300c, the least significant portion of decoded data packet 330c that includes the idle value, e.g., portion 323c, is replaced in data packet 320c by encoder circuit 101 before the encoded data packet is sent. Since mask value 325 is placed into the least significant portion, portions 323a and 323b, which include valid information, are shifted into the next higher significance portions and portion 323c is removed from data packet 320c. Since portions 323e and 323f are not removed, their values are replaced with the particular value. This prevents any one of segments 127 of interface circuit 110 from sending an idle value to the corresponding segments 227 in interface circuit 210. Otherwise, if an individual one of segments 227 were to receive the idle value, that particular segment might enter an idle state and thereby fail to receive the respective portion of data packet 320c.

Figure 4:
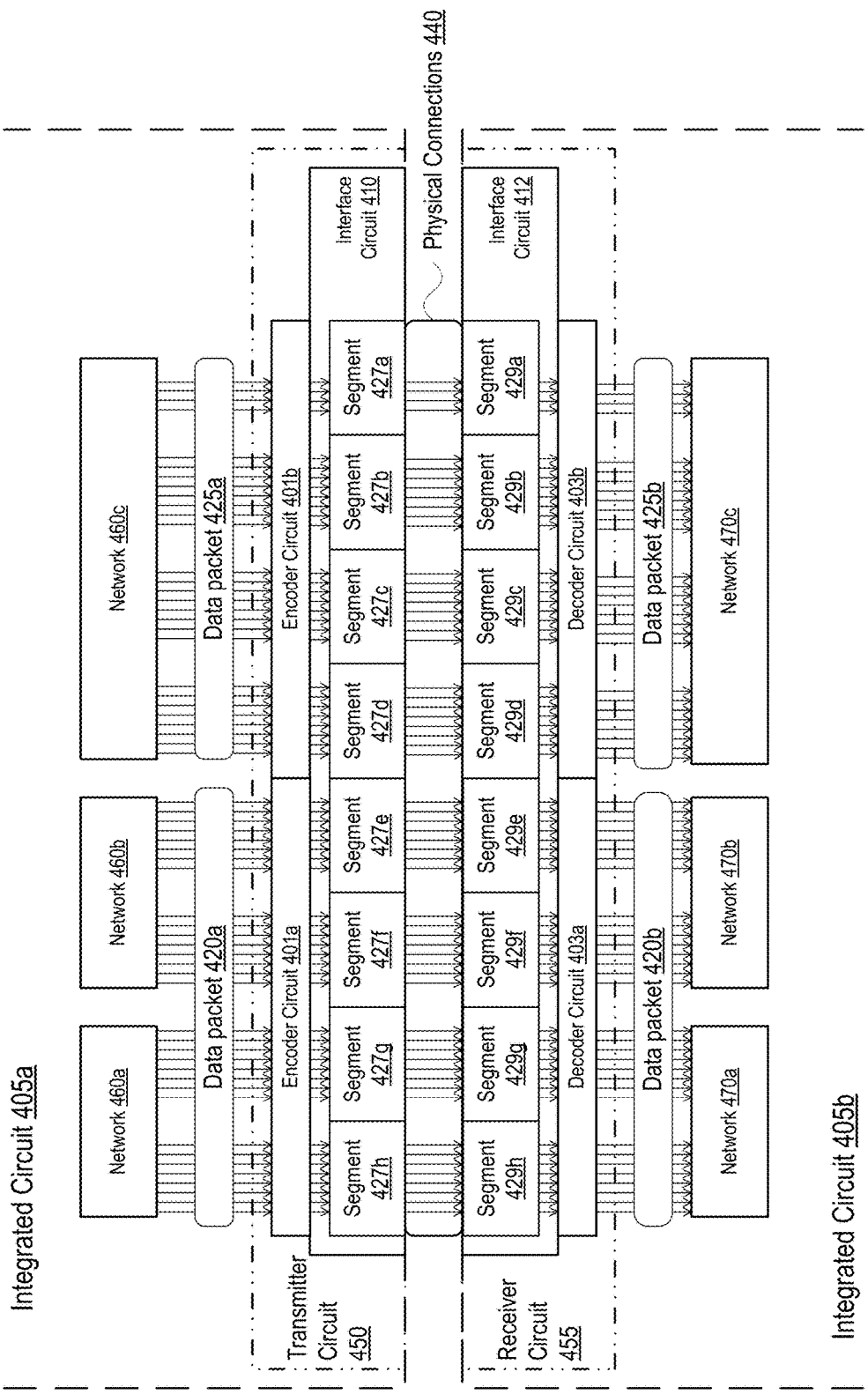
FIG. 4 illustrates a block diagram of an embodiment of a system that includes two integrated circuits coupled by respective communication interfaces.

It is noted that the examples of FIG. 3 are merely for demonstrating disclosed concepts. The examples are limited to showing data packets and a decoder circuit to clearly illustrate the described techniques. In the illustrated examples, the most significant bit of the least significant portion of a data packet is used as an indication of a mask value. In other embodiments, however, any suitable bit of any suitable portion FIGS. 1 and 2 describe respective embodiments of an encoder circuit and a decoder circuit, as well as their associated interface circuits. Encoder and decoder circuits may be used together in various embodiments. FIG. 4 illustrates an embodiment of a system that includes an encoder circuit and a decoder circuit that are coupled via their respective interface circuits.

Proceeding to FIG. 4, a block diagram of an embodiment of a system that includes two integrated circuits coupled via a physical connection between respective interface circuits is shown. In the illustrated embodiment, system 400 includes integrated circuits 405a and 405b coupled via physical connection 440. Integrated circuit 405a includes transmitter circuit 450 and networks 460a-460c (collectively networks 460). Similarly, integrated circuit 405b includes receiver circuit 455 and networks 470a-470c (collectively networks 470). Transmitter circuit 450 includes encoder circuits 401a and 401b and interface circuit 410. Receiver circuit 455 includes decoder circuits 403a and 403b, and interface circuit 412. Interface circuits 410 and 412 include respectively, segments 427a-427h (collectively segments 427) and segments 429a-429h (collectively segments 429).

In some embodiments, dies for integrated circuits 405a and 405b are configured as a single system 400 in which the existence of multiple semiconductor dies is transparent to software executing on the single system. Networks 460 on integrated circuit 405a and networks 470 on integrated circuit 405b may be coupled to a variety of agents on the respective die. These agents (not illustrated) may include, as disclosed above, any suitable combination of general-purpose processors, graphics, processors, memory controllers, and the like. Different types of agents may be coupled to one or more of the different networks. For example, networks 460a and 460b may be coupled to a processor complex that includes a plurality of processor circuits, while network 460c is coupled to one or more memory controllers. Networks 470a and 470b may be coupled to a similar processor complex on integrated circuit 405b and network 470c coupled to a similar one or more memory controllers. In some embodiments, integrated circuit 405a and 405b may correspond to different instances of a same integrated circuit design.

For example, software executing on a processor circuit (not shown) in integrated circuit 405a may be coupled to one or more of networks 460 and, using a coupled network 460, initiate transactions that include sending one or more data packets, including, e.g., data packet 425a, to a functional circuit (not shown) included in integrated circuit 405b. Data packet 425a, without explicit commands from the software executing on the processor, may be encoded via encoder circuit 401b, sent via interface circuit 410 to interface circuit 412 in integrated circuit 405b where it is then decoded by decoder circuit 403b and forwarded on to the destination functional circuit using network 470c.

Techniques such as are utilized in system 400 may allow a scalable system solution that is scalable from a single integrated circuit to multiple integrated circuits coupled via their respective interface circuits. This scalable solution may enable reuse of software with few, if any, changes across systems with varying numbers of integrated circuits.

To enable communication across the integrated circuit dies, integrated circuit 405a, as shown, includes transmitter circuit 450, which further includes a first set of segments 427. In a similar manner as described above for segments 127, segments 427 (as well as segments 429) may be implemented as multiple instances of a single circuit design that is used as a building block for creating an interface circuit with a number of pins that is a multiple of the number of pins in a single one of segments 427 or 429. Use of such building blocks for creating an interface circuit may reduce a design complexity as well as create an interface with pins that have similar characteristics across the entire interface circuit. Although only eight segments are shown in each of interface circuits 410 and 412, other embodiments may have tens or hundreds of segments. In an interface circuit with a number of pins in the hundreds or even thousands, similar characteristics across the interface may make it easier for designers to manage the timing of signals in the various segments.

As disclosed above, integrated circuits 405a and 405b each include a plurality of networks 460 and 470, respectively. Groups of segments 427 are coupled, respectively, to groups of networks 460. As shown, segments 427g-427h are assigned to network 460a, segments 427e-427f are assigned to network 460b, and segments 427a-427d are assigned to network 460c. It is noted that segment 427a may not be fully utilized by network 460c. In some embodiments, the excess pins of segment 427a may be used by a different network. In other embodiments, the excess pins may be left unused or otherwise utilized for other functions, such as providing a clock signal, power signal, and/or ground reference signal. Groups of segments 429 are assigned to respective groups networks 470 in a similar manner.

As illustrated, transmitter circuit 450 is configured to, in response to a determination that no data packet is available to send, send an idle value. This idle value corresponds to a particular value per segment 427, e.g., all logic low or all logic high values. A given segment of segments 429 is configured to enter an idle state in response to receiving the idle value from a corresponding one of segments 427. Since the idle state is, in the current embodiment, implemented per each segment, techniques such as previously described are utilized to avoid inadvertently sending an idle value on a given segment 427 when a bit sequence in a received data packet happens to be the same as the idle value.

Transmitter circuit 450, as shown, is further configured to receive a particular data packet (e.g., data packet 420a) that includes a plurality of values associated with respective ones of segments 427. At least one value of the plurality of values, has a same value as the idle value. Data packet 420a is received by encoder circuit 401a from a combination of network 460a and 460b. In various embodiments, a given data packet may be received from one or more networks. Data packet 420a is depicted as having four portions, each portion aligning with a respective one of segments 427e-427h of the plurality of segments 427. As stated, one or more of these portions have a value that is the same as an idle value. Data packet 420a, however, includes information other than idle values and the presence of an idle value aligning with one or more of segments 427e-427h is a random occurrence and not intended to trigger an idle state in a corresponding one or more of segments 429e-429h. For example, an idle value in segment 427g may cause segment 429g to enter the idle state.

In order to avoid triggering an idle state in segment 429g, transmitter circuit 450 is further configured to replace a value associated with a particular one of segments 427e-427h with a mask value to generate an encoded data packet. In various embodiments, a particular one of the set of segments aligned with a given data packet is used to store and transmit the mask value that identifies which ones of the set of segments originally held an idle value. Continuing the example from the prior paragraph, segment 427g has the idle value while the other three segments have non-idle values. In the current example, segment 427e is used to hold the mask value. Any of the other three segments may be used in other embodiments. Accordingly, encoder circuit 401a is configured to generate a mask value that indicates that segment 427g originally held a value corresponding to the idle value. Encoder circuit 401a is further configured to use a portion of the mask value to indicate the inclusion of the mask value in segment 427e, and to then place the generated mask value into segment 427e. To generate an encoded data packet in segments 427e-427h, the non-idle values of data packet 420a that aligned to segments 427e and 427f are shifted into segments 427f and 427g, respectively. The idle value that originally aligned to segment 427g is removed, having been replaced by the mask value now in segment 427e. Transmitter circuit 450 is further configured to send the encoded data packet via segments 427e-427h.

As depicted, receiver circuit 455, including a second set of segments 429 aligned with and coupled to segments 427, is configured to receive the encoded data packet via segments 429e-429h. Segments 427 are coupled to respective ones of segments 429 via physical connections 440. In various embodiments, physical connections between integrated circuit 405a and 405b may be implemented using solder bumps on bonding pads of interface circuits 410 and 412, using an interposer device between the dies of integrated circuits 405a and 405b, abutting integrated circuits 405a and 405b along one edge of the respective dies and using bond wires as physical connections 440, or using other suitable methods.

After receiving the encoded data packet from transmitter circuit 450, receiver circuit 455, as shown, is further configured to extract the mask value from the received data packet. Decoder circuit 403a is configured to detect the indication in the value received from segment 427e and held in segment 429e that determines whether the portion of the received value is a mask value or information associated with the original data packet 420a. Since segment 427e holds the mask value, the portion indicates the presence of the mask value and decoder circuit 403a extracts the value, for example, placing the value into a register, memory location, or other form of latching circuit.

As illustrated, receiver circuit 455 is further configured to replace, in the received data packet 420b, the mask value with a restoration value that corresponds to the idle value, and to reconstruct, using the mask value, data packet 420b, including the restoration value. Decoder circuit 403a is further configured to use a restoration value, equal to the idle value, to replace the extracted mask value. Decoder circuit 403a further uses the mask value to identify that data packet 420b should have the restoration value in the portion that is aligned to segment 429g. Decoder circuit 403a places the restoration value in this identified position of data packet 420b and shifts the values received in segments 429f and 429g over into the portions aligned with segments 429e and 429f, respectively. Data packet 420b, accordingly, is reconstructed to match data packet 420a and segment 429g is prevented from entering an idle state despite the inclusion of an idle value in the original data packet 420*a*.

Although communication is shown as being transmitted by integrated circuit 405*a* and received by integrated circuit 405*b*, in some embodiments, integrated circuit 405*b* includes one or more transmitter circuits and integrated circuit 405*a* includes one or more receiver circuits, thereby enabling communication back and forth between the two integrated circuits. Additionally, other embodiments may include more than two integrated circuits coupled via respective interface circuits by a plurality of physical connections.

It is noted that FIG. 4 is merely one example of the disclosed concepts. Although two integrated circuits are shown, any suitable number may be included in other embodiments. The number of illustrated elements are limited for clarity. In other embodiments, any suitable number of each of the various elements may be included. For example, eight segments in total are illustrated for each interface circuit. In other embodiments, any suitable number of segments may be included, as well as any suitable number of pins per segment.

The circuits and techniques described above in regards to FIGS. 1-4 may be utilized to encode and decode data packets for transmission across an interface circuit. Two methods associated with encoding and decoding data packets are described below in regards to FIGS. 5 and 6.

Proceeding now to FIG. 5, a flow diagram for an embodiment of a method for encoding a data packet that includes an idle value is shown. Method 500 may be performed by a system that includes an encoder circuit and an interface circuit with a plurality of segments, such as systems 100 and 400 in FIGS. 1 and 4. Referring collectively to FIGS. 4 and 5, method 500 begins in block 510.

At block 510, method 500 includes receiving, by encoder circuit 401*b*, data packet 425*a* having a plurality of bits arranged in an original order for sending via interface circuit 410 that includes a plurality of segments 427. As illustrated, data packet 425*a* is received by encoder circuit 401*b* from network 460*c*. Network 460*c* may by coupled to one or more agents in integrated circuit 405*a*, one of which sources a transaction that includes sending data packet 425*a* to a destination agent on integrated circuit 405*b*. Data packet 425*a* is sent via interface circuit 410 which is coupled to interface circuit 412 of integrated circuit 405*b* by physical connections 440. From interface circuit 412, the data packet is sent via network 470*c* to the destination agent. Interface circuits 410 and 412 are each implemented using a plurality of segments 427 and 429, respectively.

Method 500, at block 520, further includes determining, by encoder circuit 401*b*, that a group of the plurality of bits corresponds to an idle value for a subset of the plurality of segments 429. As shown in FIG. 4, segments 427 are coupled, via physical connections 440, to respective ones of segments 429. When no data packet is available for sending, by interface circuit 410, an idle value may be generated by the segments 427 that causes the respective segment 429 to enter the idle state as described above. In the current embodiment, the idle state is implemented per segment. If segment 427*h* sends the idle value while segments 427*e*-427*g* send other valid information, then segment 429*h* enters the idle state while segments 429*e*-429*g* receive the information from their respective segments 427. This segmented implementation allows segments 427*e*-427*h* to assert idle values when encoder circuit 401*a* does not have a data packet to send, while segments 427*a*-427*d* may be sending data packet 425*a*.

Accordingly, to ensure data packet 425 is sent and received without unintentionally causing one of segments 429*a*-429*d* to enter the idle state, method 500 includes determining values of portions of data packet 425 that align with ones of segments 427*a*-427*d*. Determined values of these portions that are the same as the idle value are identified. For the example of FIG. 5, portions data packet 425*a* that are aligned with segments 427*b* and 427*d* are identified as being the same as the idle value.

At block 530, the method further includes self-encoding, by encoder circuit 401*b*, data packet 425*a* by replacing at least a portion of the group of bits with a mask value that indicates, to decoder circuit 403*b*, how to decode the self-encoded data packet. As illustrated, replacing the at least a portion of the group of bits with the mask value includes replacing bits of segment 427*b* with the mask value. For data packet 425*a*, however, the mask value is sent in a particular one of segments 427*a*-427*d*, in this example, segment 427*a*. Accordingly, replacing the idle value associated with segment 427*b* includes shifting the bits of segment 427*a* into segment 427*b*, and placing the mask value in segment 427*a*. Placing the mask value in segment 427*a* includes setting one or more bits of the segment 427*a* (e.g., the most or least significant bit) to a value that indicates that the mask value is included in segment 427*a*. As previously described, the most significant bit of segment 427*a* may be set to a logic high value to indicate that the mask value is included.

In addition, removing idle values from data packet 425*a* includes replacing bits of segment 427*d* with a predetermined value that is different than the idle value. Since the value of the portion of data packet 425*a* that aligns with segment 427*d* is also equal to the idle value, this value is replaced with the particular value, e.g., the complement of the idle value, to prevent the sending of an unintended idle value to segment 429*d*. The mask value placed into segment 427*a* includes indications that data packet 425*a* includes idle values in the portions aligned with segments 427*b* and 427*d*. Segments 427*a*-427*d* now hold a self-encoded version of data packet 425*a*. As used herein, "self-encoded" refers to a data packet, including a given number of bits, that is encoded to include one or more control signals without increasing the number of bits of the data packet and without loss of information included in the unencoded version of the data packet.

Method 500 also includes, at block 540, sending, by interface circuit 410 using segments 427*a*-427*d*, the self-encoded data packet to decoder circuit 403*b*. After encoder circuit 401*b* generates the self-encoded version of data packet 425*a*, the self-encoded data packet is sent via segments 427*a*-427*d* to corresponding ones of segments 429*a*-429*d*. Segments 427*b* and 427*d*, which, in the original version of data packet 425*a* were aligned with portions that corresponded to the idle value, now transmit non-idle values that are received by segments 429*ab* and 429*d*, respectively, without triggering an idle state.

In some embodiments, method 500 may end in block 540, or in other embodiments, may repeat in response to new data to be exchanged between encoder circuit 401*b* and decoder circuit 403*b*. It is noted that the method of FIG. 5 is merely an example for encoding a data packet that includes an idle value.

Figure 6:
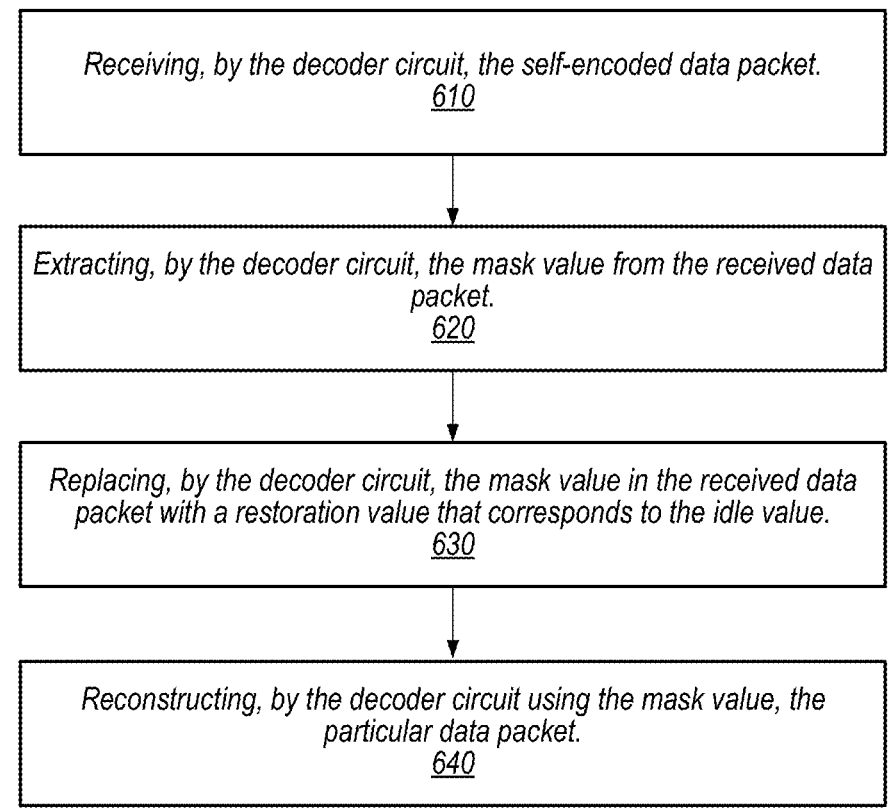
FIG. 6 shows a flow diagram of an embodiment of a method for decoding a data packet that includes a mask value.

Turning now to FIG. 6, a flow diagram for an embodiment of a method for decoding a received data packet that includes a mask value is illustrated. In a similar manner as for method 500 above, method 600 may be performed by a system that includes an decoder circuit and an interface circuit with a plurality of segments, such as systems 200 and 400 in FIGS. 2 and 4. Method 600 may be performed in response to a performance of method 500. Referring collectively to FIGS. 4 and 6, method 600 begins in block 610 after block 540 of method 500 is performed.

Method 600, at block 610, includes receiving, by decoder circuit 403b, the self-encoded data packet. As illustrated, the self-encoded version of data packet 425a is received via segments 429a-429d of interface circuit 412. As described above in regards to FIG. 5, the received self-encoded data packet includes a mask value in segment 429a.

At block 620, method 600 also includes extracting, by decoder circuit 403b, the mask value from the received data packet. As described above, encoder circuit 401b includes an indication that the value sent via segment 427a and received via segment 429a includes a mask value that identifies ones of the segments that should have values corresponding to the idle value, but instead hold non-idle values to avoid triggering unintentional idle states. In some embodiments, the mask value is read from segment 429a and then stored into a register or memory location, such as register 230 in FIG. 2. Decoder circuit 403b identifies the inclusion of the mask value by detecting a portion of bits set to a particular value, e.g., the most significant bit of segment 429a may be a logic high value.

Method 600 further includes, at block 630, replacing, by decoder circuit 403b, the mask value in data packet 425b with a restoration value that corresponds to the idle value. Since the mask value was not a part of the original data packet 425a, decoder circuit replaces the mask value with the restoration value. Since encoder circuit 401b removes idle values from self-encoded data packets, decoder circuit 403b is configured to use the idle value as a restoration value.

At block 640, method 600 further includes reconstructing, by decoder circuit 403b using the mask value, data packet 425b. Using the mask value, decoder circuit 403b identifies that segments 429b and 429d should have the restoration value rather than the values they hold. In addition, decoder circuit 403b uses the mask value to determine that the value held in segment 429b has been shifted and should be shifted back to align with segment 429a. After shifting the value in segment 429b to the least significant portion of data packet 425b, the restoration value is placed into the portions of data packet 425b that align with segments 429b and 429d. Data packet 425b is now decoded and has a same value as original data packet 425a. Method 600 may end after performing the operations of block 640, or may repeat if another self-encoded data packet is ready to be received.

Use of such encoding and decoding techniques as described in methods 500 and 600, as well as the remainder of this disclosure, may enable use of idling techniques between two or more interfaces without increasing a number of signals between the two interfaces. By self-encoding data packets, additional control information (e.g., a mask value) may be added to the data packets when applicable to identify information that may otherwise create an unintentional reaction (e.g., an idle state).

It is noted that the method of FIG. 6 is merely an example for decoding self-encoded data packets. Method 600 may be performed by any instances of the integrated circuits disclosed in FIGS. 1-4. Variations of the disclosed methods are contemplated, including combinations of operations of methods 500 and 600, such as performing the methods in series.

Figure 7:
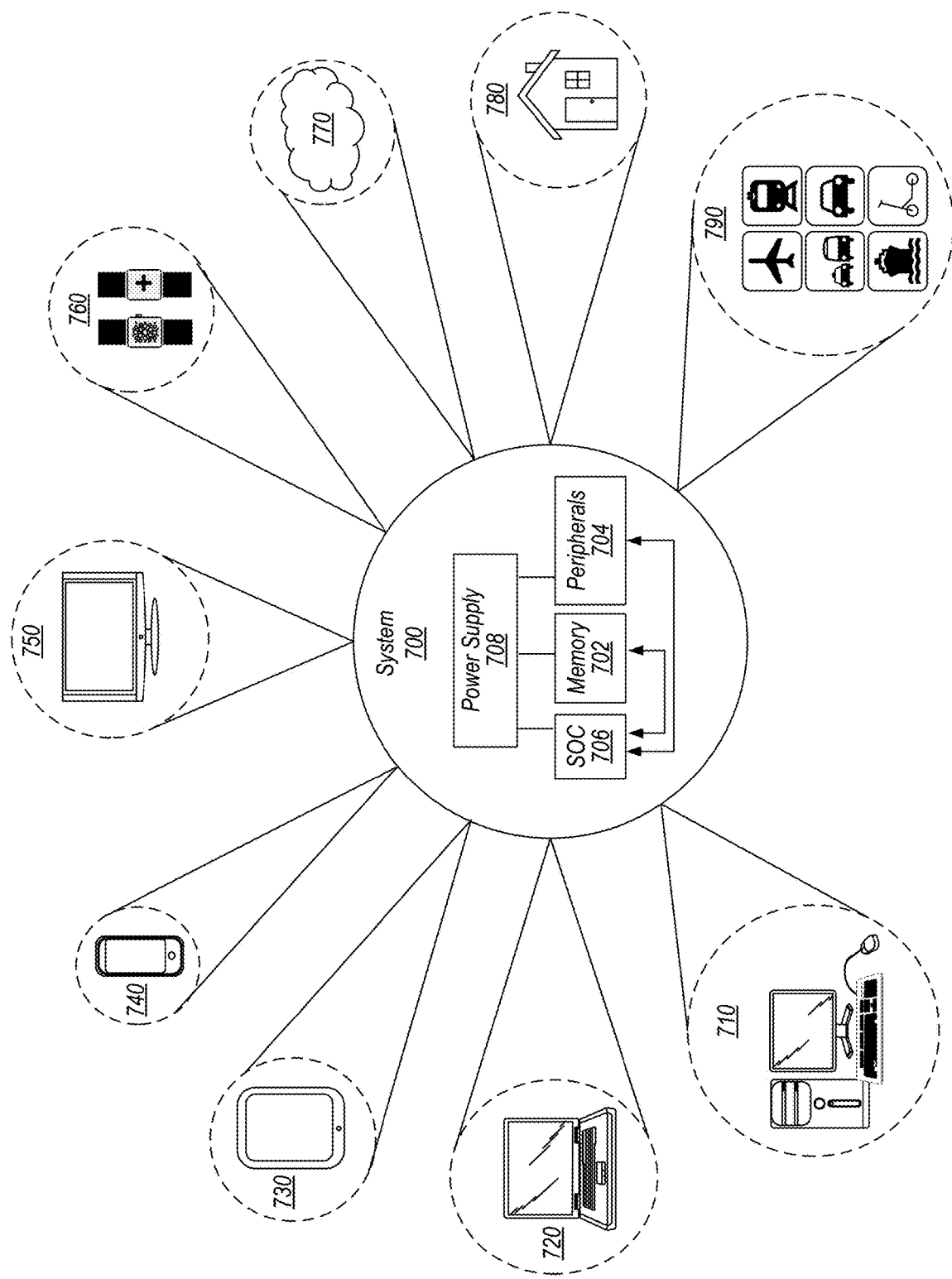
FIG. 7 depicts various embodiments of systems that include coupled integrated circuits.

FIGS. 1-6 illustrate apparatus and methods for a system that includes encoding and decoding data packets sent between two or more interface circuits. Any embodiment of the disclosed systems may be included in one or more of a variety of computer systems, such as a desktop computer, laptop computer, smartphone, tablet, wearable device, and the like. In some embodiments, the circuits described above (e.g., integrated circuits 405a and 405b) may be implemented on one or more systems-on-chip (SoCs) or other type of integrated circuits. A block diagram illustrating an embodiment of computer system 700 is illustrated in FIG. 7. Computer system 700 may, in some embodiments, include any disclosed embodiment of systems 100, 200, and 400. Integrated circuits 405a and 405b, in some embodiments, may each correspond to one instance, or to respective portions, of computer system 700.

In the illustrated embodiment, the system 700 includes at least one instance of a system on chip (SoC) 706 which may include multiple types of processing circuits, such as a central processing unit (CPU), a graphics processing unit (GPU), or otherwise, a communication fabric, and interfaces to memories and input/output devices. In some embodiments, one or more processors in SoC 706 includes multiple execution lanes and an instruction issue queue. In various embodiments, SoC 706 is coupled to external memory 702, peripherals 704, and power supply 708. In an embodiment, SoC 706 may be implemented using a combination of integrated circuits 405a and 405b coupled together by physical connections 440 to operate as a single SoC.

A power supply 708 is also provided which supplies the supply voltages to SoC 706 as well as one or more supply voltages to the memory 702 and/or the peripherals 704. In various embodiments, power supply 708 represents a battery (e.g., a rechargeable battery in a smart phone, laptop or tablet computer, or other device). In some embodiments, more than one instance of SoC 706 is included (and more than one external memory 702 is included as well).

The memory 702 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 704 include any desired circuitry, depending on the type of system 700. For example, in one embodiment, peripherals 704 includes devices for various types of wireless communication, such as Wi-Fi, Bluetooth, cellular, global positioning system, etc. In some embodiments, the peripherals 704 also include additional storage, including RAM storage, solid state storage, or disk storage. The peripherals 704 include user interface devices such as a display screen, including touch display screens or multi-touch display screens, keyboard or other input devices, microphones, speakers, etc.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices 770 are contemplated as well, such as devices worn around the neck, devices attached to hats or other headgear, devices that are implantable in the human body, eyeglasses designed to provide an augmented and/or virtual reality experience, and so on.

System 700 may further be used as part of a cloud-based service(s) 780. For example, the previously mentioned devices, and/or other devices, may access computing resources in the cloud (i.e., remotely located hardware and/or software resources). Also illustrated in FIG. 7 is the application of system 700 to various modes of transportation 790. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise.

It is noted that the wide variety of potential applications for system 700 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 7 are illustrative only and are not intended to be limiting. Other devices are possible and are contemplated.

As disclosed in regards to FIG. 7, computer system 700 may include two or more integrated circuits coupled together and included within a personal computer, smart phone, tablet computer, or other type of computing device. A process for designing and producing an integrated circuit using design information is presented below in FIG. 8.

Figure 8:
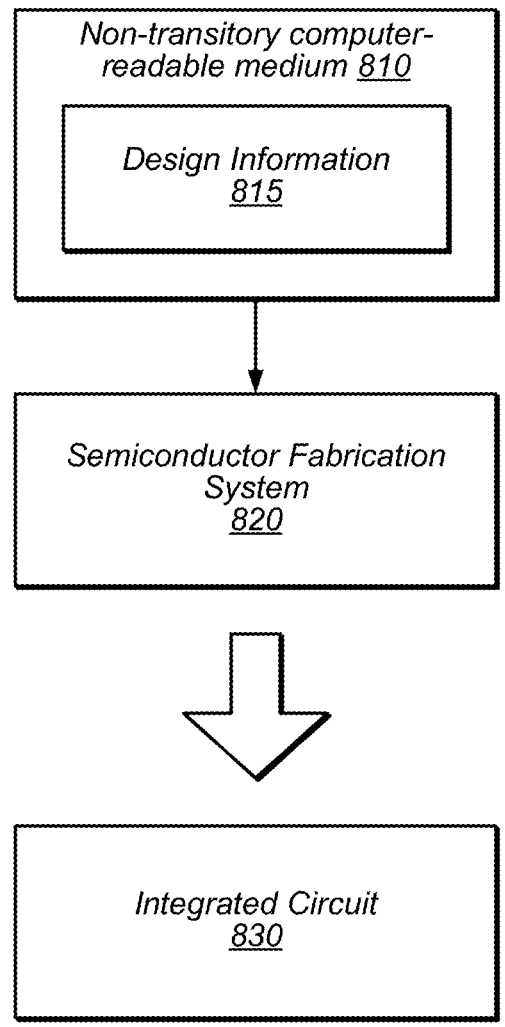
FIG. 8 shows a block diagram of an example computer-readable medium, according to some embodiments.

FIG. 8 is a block diagram illustrating an example of a non-transitory computer-readable storage medium that stores circuit design information, according to some embodiments. The embodiment of FIG. 8 may be utilized in a process to design and manufacture integrated circuits, such as, for example, integrated circuits 405*a* and 405*b* as shown in FIG. 4. In the illustrated embodiment, semiconductor fabrication system 820 is configured to process the design information 815 stored on non-transitory computer-readable storage medium 810 and fabricate integrated circuit 830 (e.g., integrated circuits 405*a* and 405*b*) based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system, such as semiconductor fabrication system 820, for example. In some embodiments, design information 815 may include a netlist that specifies elements of a cell library, as well as their connectivity. One or more cell libraries used during logic synthesis of circuits included in integrated circuit 830 may also be included in design information 815. Such cell libraries may include information indicative of device or transistor level netlists, mask design data, characterization data, and the like, of cells included in the cell library.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown or described herein. Further, integrated circuit 830 may be configured to perform various functions described herein in conjunction with other components. Further, the functionality described herein may be performed by multiple connected integrated circuits, such as integrated circuits 405*a* and 405*b* in FIG. 4.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:
an interface circuit, including a plurality of segments, configured to:
send individual bits of a data packet in parallel via the plurality of segments; and
send an idle value via the plurality of segments when no data packet is available to send, wherein the idle value corresponds to a particular bit sequence per segment, and wherein the idle value is configured to cause a corresponding segment in a receiving apparatus to be idle; and
an encoder circuit configured to:
receive a particular data packet having a plurality of bits arranged in an original order;
in response to a determination that a group of the plurality of bits have a same value as the idle value for a subset of the plurality of segments, replace at least a portion of the group of bits with a mask value to generate a modified data packet, wherein the mask value indicates, to the receiving apparatus independent of control signals external to the particular data packet, how to recreate the particular data packet with the bits arranged in the original order; and
send the modified data packet to the receiving apparatus via the plurality of segments of the interface circuit.

2. The apparatus of claim 1, wherein to replace the at least a portion of the group of bits with the mask value, the encoder circuit is configured to include the mask value within a particular segment of the plurality of segments.

3. The apparatus of claim 2, wherein the encoder circuit is further configured to modify values of one or more of the group of bits for the subset of segments.

4. The apparatus of claim 2, wherein to include the mask value in the particular segment, the encoder circuit is further configured to shift one or more bits of the plurality of bits from the particular segment into a different segment and insert the mask value into a particular set of bit positions vacated by the shifted bits.

5. The apparatus of claim 2, wherein to include the mask value in the particular segment, the encoder circuit is further configured to set a particular bit of the particular segment to a value that indicates that the mask value is included in the particular segment.

6. The apparatus of claim 1, wherein to send the idle value, the interface circuit is configured to send the idle value in a particular set of segments of the plurality of segments.

7. The apparatus of claim 1, further comprising a plurality of networks, and wherein a first and a second group of the plurality of segments are coupled, respectively, to a first and a second network of the plurality of networks.

8. A method comprising:
receiving, by an encoder circuit, a particular data packet having a plurality of bits arranged in an original order for sending via an interface circuit that includes a plurality of segments;
determining, by the encoder circuit, that a group of the plurality of bits corresponds to an idle value for a subset of the plurality of segments;
self-encoding, by the encoder circuit, the particular data packet by replacing at least a portion of the group of bits with a mask value that indicates, to a receiving decoder circuit, how to decode the self-encoded data packet; and
sending, by the interface circuit using the plurality of segments, the self-encoded data packet to the decoder circuit.

9. The method of claim 8, wherein replacing the at least a portion of the group of bits with the mask value includes replacing bits of a particular segment of the plurality of segments.

10. The method of claim 9, further comprising replacing bits of one or more of the subset of segments with a predetermined value that is different than the idle value.

11. The method of claim 9, further comprising shifting the bits of the particular segment into a different segment of the plurality of segments.

12. The method of claim 9, wherein replacing the bits of the particular segment includes setting one or more bits of the particular segment to a value that indicates that the mask value is included in the particular segment.

13. The method of claim 8, further comprising:
receiving, by the decoder circuit, the self-encoded data packet; and
extracting, by the decoder circuit, the mask value from the received data packet.

14. The method of claim 13, further comprising:
replacing, by the decoder circuit, the mask value in the received data packet with a restoration value that corresponds to the idle value; and
reconstructing, by the decoder circuit using the mask value, the particular data packet.

15. A system, comprising:
a transmitter circuit, including a first set of segments, configured to:
in response to a determination that no data packet is available to send, send an idle value, wherein the idle value corresponds to a particular value per segment;

receive a particular data packet that includes a plurality of values associated with respective ones of the first set of segments, wherein at least one value of the plurality of values, has a same value as the idle value;

replace a value associated with a particular one of the first set of segments with a mask value to generate an encoded data packet; and send the encoded data packet via the first set of segments; and a receiver circuit, including a second set of segments aligned with and coupled to the first set of segments, configured to:

receive the encoded data packet via the second set of segments;

extract the mask value from the received data packet;

replace, in the received data packet, the mask value with a restoration value that corresponds to the idle value; and reconstruct, using the mask value, the particular data packet, including the restoration value.

16. The system of claim 15, wherein the transmitter circuit is further configured, in response to a determination that more than one of the plurality of values has the same value as the idle value, to replace values that are the same as the idle value with a predetermined value that is different than the idle value.

17. The system of claim 16, wherein to reconstruct the particular data packet, the receiver circuit is configured to:

identify, using the mask value, ones of the second set of segments that include the predetermined value; and replace the predetermined value with the idle value.

18. The system of claim 15, wherein the first set of segments have an order from a most significant segment to a least significant segment, and wherein to generate the encoded data packet, the transmitter circuit is configured to place the mask value in the least significant segment.

19. The system of claim 15, wherein the receiver circuit is further configured to identify an inclusion of the mask value using a portion of a received value from the particular one of the first set of segments, wherein the inclusion of the mask value is indicated by a particular value in the portion.

20. The system of claim 15, wherein a given segment of the second set of segments is configured to enter an idle state in response to receiving the idle value from a corresponding one of the first set of segments.

* * * * *